Patented Jan. 16, 1923.

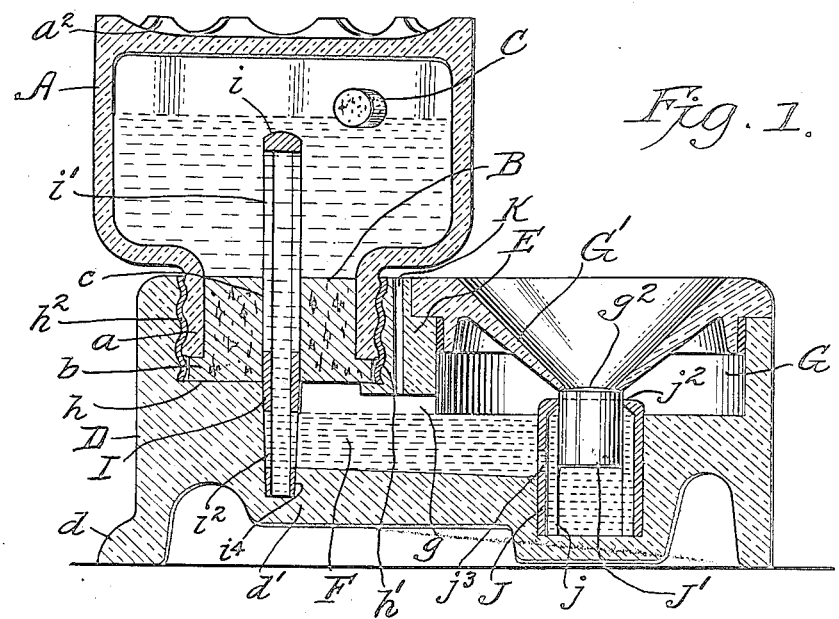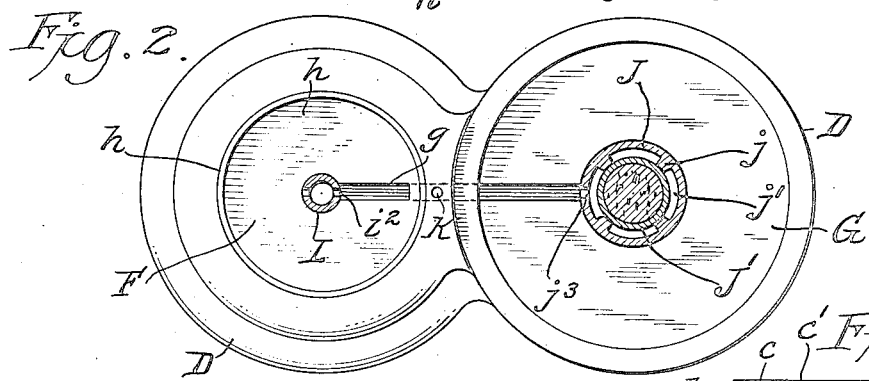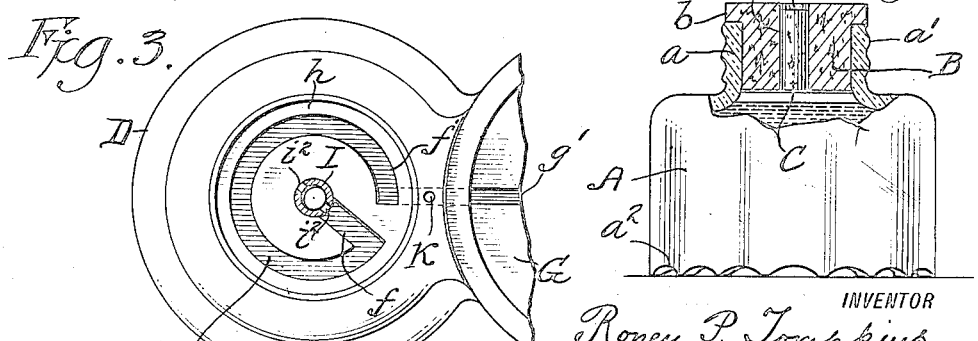

1,442,499

UNITED STATES PATENT OFFICE.

RONEY P. TOMPKINS, OF LONG ISLAND CITY, NEW YORK.

INK CONTAINER.

Application filed May 6, 1918. Serial No. 232,681.

*To all whom it may concern:*

Be it known that I, RONEY P. TOMPKINS, a citizen of the United States, residing at Long Island City, county of Queens, and State of New York, have invented a certain new and useful Ink Container, of which the following is a specification.

This invention is a container for ink and other liquids, and it includes, also, means for dispensing such liquids from the original package.

Among the several features of the invention are, first, a container wherein the liquid is initially deposited, stored and transported until it is desired to utilize the container and its contents, whereupon the container is brought into serviceable relation to appropriate dispensing means so that the liquid is dispensed from the original package; second, means for securely closing said container so as to preclude spilling the liquid and to exclude air therefrom, said closure being operable during the act of assembling the container with respect to the dispensing means in such manner as to obviate the necessity for removing the closure from the container, thus preventing the operator from soiling the fingers; third, dispensing means embodying a coupling for the original container and a chamber into which the liquid flows so as to be kept at a predetermined level therein and from which the ink is dipped out by the insertion of a pen as required; fourth, means constituting an element of the dispensing means whereby the closure is opened in the act of assembling said container with the dispensing means; fifth, a vent for the escape of air from the liquid chambers so as to preclude expansion of the air confined within the chambers from elevating the liquid to an undesirably high level, which vent is so related to the other elements of the dispensing device that the liquid cannot find an exit through it should the device be upset accidentally; sixth, to provide a cooperating reservoir tube and float so related to each other that a full supply of the liquid is at all times available whereas the float cuts off the free inlet of air through the dip opening and is readily depressible by slight pressure from the pen, and, finally, to provide a simple construction which is economical of manufacture and efficient in operation.

Other functions and advantages of the invention will appear from the following description, taken in connection with the drawings, wherein Fig. 1 is a vertical section through the dispensing device and the attached container.

Fig. 2 is a top plan view of the dispensing device, the container being removed, showing certain of the parts in horizontal cross section.

Fig. 3 is a plan of a part of the dispensing device illustrating another form of the feed chamber.

Fig. 4 is an elevation, partly in section, of the container wherein the liquid is packed initially.

The container A is of suitable form and dimensions and composed preferably of glass, said container being provided with a neck $a$ which is formed with a male screw thread $a'$. The base of the container is corrugated at $a^2$, thereby producing recesses when the container is inverted as in Fig. 1, which recesses are adapted to receive pens or pencils when the container is used in connection with the dispensing device. The neck of the container is normally closed by a stopper B composed of compressible material, usually cork, although it is apparent that other material suitable for the purpose can be employed. As shown, the cork stopper is provided with a flange $b$ integral with the stopper, but it will be readily understood that the top portion of the stopper may consist of a disk of rigid material the diameter of which exceeds the cork so as to produce a flange equivalent to the flange $b$. When the stopper is forced into the mouth of the container its inward movement is arrested by the contact of flange $b$ with the edge of the mouth $a$, the material of the cork being forcibly compressed by the contact of said cork with the interior surface of the mouth.

The cork is provided with a passage $c$, the same being cut through the material of the stopper, and this operation of cutting the passage in the cork produces a plug C. The plug is inserted into the passage $c$ for the purpose of closing the same, and when the stopper is forced into the mouth of the container the compression of the cork material secures frictional contact between the plug C and the wall of the passage $c$, whereby the plug C is firmly retained within the stopper by frictional contact therewith. It is preferred to employ a plug C the length of which is somewhat shorter than the length of the passage c in the stopper, and when the plug is inserted for the lower end thereof to be flush with the under face of the stopper a recess c' is left between the upper end of the plug and the top surface of the stopper, although it may be desirable in some instances to employ a plug the length of which exceeds the thickness of the stopper. The recess c' serves as a means for guiding a stem of the dispensing device when the container is inverted for the purpose of coupling it to the fountain, as will presently appear.

It will be understood that the ink or other liquid is deposited in any suitable way within the container A, after which the stopper B containing the plug C is forced into the mouth of the container for the purpose of securely closing the latter against the leakage of the liquid. The container is intended to be filled with ink and sold in the trade like an ordinary ink bottle, but owing to the construction of the container and the stopper, I am enabled to use said container in connection with the dispensing device shown in the drawings so that the ink will be supplied from the container as an original package, it being noted in this connection that the plug C is displaceable from the stopper during the operation of coupling the container to the dispensing device, thus relieving the operator from the labor of pulling out the plug, and allowing the container to be inverted upon and coupled to the dispensing device with no loss of ink during the inverting and coupling operation.

The fountain D is composed preferably of porcelain or glass, or it may be made of any material suitable for the purpose. The body of the fountain is hollow, and the lower part of said fountain is formed with a base flange d of suitable form. The interior of the fountain is divided, at least partially, by a wall E thereby producing a plurality of chambers, at least two in number, indicated at F G. The chamber F shown in Fig. 2 is circular in form, but for certain purposes said circular chamber may partake the irregular form illustrated at F' in Fig. 3, the latter illustrating a relatively narrow circular chamber having a radial channel f. The chamber G occupies the opposite end portion of the fountain D from the chamber F or F', being separated therefrom by the division wall E, and the two chambers are connected by an intermediate passage g. In Figs. 1 and 2 this passage g extends from the central portion of the chamber F to the chamber G, and below the division wall E, whereas in Fig. 3 the connecting passage indicated at g' communicates at one end with the chamber G and at its other end with the outer extremity f' of the narrow circular chamber F'.

That part of the fountain D which contains the chamber F is formed with a face or shoulder h positioned in a horizontal plane above the level of the liquid adapted to be contained in the chambers F G, said face or shoulder h constituting a seat for the stopper B of the container A when the latter is inverted and coupled to the fountain, as in Fig. 1. The seat h is in a horizontal plane above the lower edge of the division wall E intermediate the two chambers, and above this seat h that part of the fountain having the chamber F is formed with a vertical opening h' the wall of which is formed with an internal thread, or said internal thread may be provided in a lining $h^2$, as in Fig. 1.

Attached firmly to the base of the fountain is a stem I the same constituting a tubular member performing the double function of means for displacing the plug C from the stopper of the container during the operation of coupling said container to the fountain, and as a means for feeding the liquid from the container to chamber F of the fountain. Said stem or tubular member is positioned centrally in that part of the fountain having the chamber F, the lower part of said stem or tubular member being coupled or attached in any desirable way firmly to the bottom d' of the fountain. As a means for attaching the stem I to the fountain a recess $i^4$ (see Fig. 1) may be produced in the bottom d' and the lower part of the stem slightly beveled so that the stem will have a driving fit into the recess, but it is apparent that other expedients may be resorted to for the rigid attachment of the stem to the fountain. The stem is hollow for substantially its entire length, although the upper part of the stem is closed at i. Said stem is shown as having slots i' in its upper part and other slots $i^2$ in its lower part, which slots provide for the ingress and egress of the liquid with respect to the tubular stem. The stem extends a suitable distance above the fountain and when the container is coupled thereto said stem passes through the passage c of the stopper B and enters the chamber of the container A for a substantial distance, whereby the liquid present in the container will flow through the slots i', the passage of the tubular stem and out of the slots $i^2$ of said stem so as to flow into the chamber F and thence through the passage g or g' into the chamber G, the liquid flowing to a predetermined level below the bottom edge of the division wall E so as to fill the chambers F and G to a predetermined extent.

When it is desired to attach the container A to the dispensing fountain the operator inverts the container and places it over the fountain so that the upper closed end $i$ of the tubular stem enters the recess $c'$ in the stopper, after which pressure is applied to the container so as to force it downwardly over the tubular stem, the stem sliding through the passage $c$ and displacing the plug C, whereby the stem fills the passage $c$ in the stopper as the plug is displaced therefrom so as to preclude the outflow or leakage of the ink during the operation of placing the container in position upon the dispensing device. The plug is forced into the container, as shown in Fig. 1, and the threaded mouth portion $a$ of said container is screwed into the threaded member $h^2$ of the fountain, the operator rotating the container in order that the threads of the container may engage with the threads of the fountain. This rotative movement of the container is continued until the end surface of the stopper is in contact with the seat or face $h$ of the fountain, and the operator may continue to rotate the container until the stopper is compressed between the face $h$ and the shoulder formed by the edge of the mouth $a$ whereby the stopper acts as a packing to preclude leakage when the inverted container is attached by the screw coupling means to the fountain.

It should be noted that in the construction of Fig. 2 the tubular stem I is positioned for at least one of the slots $i^2$ in the lower portion thereof to communicate with the connecting passage $g$, whereas in Fig. 3 said tubular stem is turned for the slot $i^2$ to communicate with the radial passage $f$ of the chamber $F'$. In the construction of Fig. 2 the ink flows from the slot $i^2$ directly into the connecting passage $g$ leading to the chamber G, whereas in Fig. 3 the ink flows from the slot $i^2$ of the stem into radial passage $f$, and thence follows the convolution of the chamber $F'$ so as to flow from one end portion of the chamber into the connecting passage $g'$ leading to the chamber G, the construction of Fig. 3 performing the function of precluding the leakage of ink should the fountain be accidentally upset or turned on its side.

The chamber G of the fountain is covered by a top $G'$ of hollow form, and the lower end of which affords a dip opening $g^2$. Immediately below this dip opening is a tubular reservoir J attached in any suitable way to the bottom portion $d'$ of the fountain. The interior of the tubular reservoir is provided with a series of vertical ribs $j$, preferably integral with the wall of the reservoir, said ribs being equi-distantly spaced, as shown in Fig. 2, and producing a plurality of channels $j'$ intermediate said ribs. The upper part of the reservoir is formed with an inwardly projecting flange $j^2$, the latter acting as a deflector in precluding a forcible displacement of the ink and, also, to direct the flow of ink over the top face of a depressible float $J'$. The diameter of the float is such that it fits snugly within the flanges $j$ of the reservoir and the buoyancy of said float raises it to the position of Fig. 1 whereby the top surface of the float is in contact with the lower portion of the top $G'$ so as to close the dip opening $g^2$, thus excluding air from the liquid within the fountain and minimizing evaporation. When it is desired to obtain a supply of ink, the operator thrusts a pen through the opening $g^2$ and into contact with the float, the slight pressure of the pen upon which float acts to depress said float. The float acts as a piston in its downward movement within the reservoir, thereby displacing the liquid which rises through the channels $j$ and strikes the flanged top edge $j^2$ of the reservoir, thus feeding the ink over the top surface of the float and to the pen. The reservoir J is provided with a radial slot $j^3$ shown in Fig. 2, and said reservoir is positioned within the chamber G for the slot $j^3$ to communicate directly with the connecting passage $g$, whereby ink flows through the slot $j^3$ into the chamber of the reservoir.

Experience shows that the air confined within the fountain is liable to expand and contract with changes in the temperature, and to preclude undesirable pressure within the fountain, which pressure has a tendency to displace the ink, I provide a vent passage K. This passage is formed in the division wall E intermediate the chambers F G, the lower end of said passage being in free communication with the connecting passage $g$, whereas the outer end of the vent passage is open to the atmosphere. Said vent passage is comparatively small in diameter, although it is sufficient for the purpose of allowing the air to escape when it expands within the fountain, but should the fountain become upset or turned over on its side no ink can escape through the passage because the ink will flow to one side or the other of the chambers F G within the fountain.

In addition to the function of a vent to the air confined within the fountain, the vertical passage K in the division wall between the chambers may operate as a receptacle for a fountain-pen filler.

It will be understood that a fountain pen filler can easily be inserted, point downward, into the vent passage K, the latter being open at the top end for such purpose, so that any ink present in the filler will drain into the horizontal channel $g$, thus avoiding waste of the ink which may remain in the filler. The vertical passage K is thus adapted to perform two functions, first as a vent to the air confined within the ink well and as a receptacle for supporting a filler in a perpendicular position convenient to the operator for removal from the ink well or fountain, the said filler being held in such a way as to avoid interference with the normal use of the ink well. To adapt the passage K for the purpose mentioned, it may become necessary to enlarge it somewhat but it is obvious that such slight changes can readily be made by a mechanic skilled in the calling.

Having thus fully described the invention, what I claim as new and desire to secure by Letters Patent is:

1. In a device of the class described, a container provided with a mouth portion, a stopper for closing said mouth portion, the body of said stopper being composed of compressible material and being provided with a transverse opening, and a plug inserted within said opening, said plug being substantially enveloped by the compressible body of the stopper and being retained fixedly in position by frictional contact due to the compressibility of the material comprising said stopper.

2. In a device of the class described, a container, a stopper therefor provided with a transverse opening, said stopper being composed of compressible material, and a plug occupying said opening and retained fixedly in position by frictional contact due to the compressibility of the stopper material when closing the container, the length of said plug being less than the thickness of the stopper and an end portion of said plug being positioned below the top face of the stopper, thereby producing a recess in the top face of the stopper.

3. In a device of the class described, a container, a stopper for closing the mouth of said container, the body of said stopper being composed of compressible material and being provided with an axial passage, and a plug occupying said axial passage and retained therein by frictional contact due to the compressibility of the material composing said stopper, said plug being surrounded by the compressible material of the stopper and said plug being displaceable from the stopper by applying pressure thereto in an endwise direction.

4. In a dispensing device, a container the mouth of which is closed by a stopper, the body of said stopper being composed of compressible material and being provided with an axial passage, and a displaceable plug separate from the stopper and retained fixedly in position within the axial passage by the compressibility of the material composing said stopper, in combination with a fountain provided with a seat upon which is adapted to be imposed the inverted container, means coupling the container to said fountain, and a tubular member extending upwardly from the fountain and positioned to pass through the stopper and to enter the chamber of said container, said tubular member operating to displace the plug from said stopper in the act of coupling the container to the fountain.

5. In a dispensing device, a container, an apertured stopper therefor, said stopper being composed of compressible material, and a displaceable plug closing the aperture in the stopper and retained fixedly in position by frictional contact, an end portion of said compressible stopper protruding beyond the mouth of said container, in combination with a fountain provided with a seat, threaded coupling means whereby the container is connected with the fountain for compressing the protruding portion of said stopper into contact with said seat of the fountain, and a tubular member extending upwardly from the fountain and positioned to displace the plug from said stopper in the act of coupling said container to said fountain.

6. In a dispensing device, a fountain provided with a plurality of chambers and with a passage connecting said chambers, an intervening wall being provided between said chambers, and a transverse passage extending through said wall on a line intermediate said chambers, said transverse passage leading upwardly from said connecting passage and opening upwardly through the top of the fountain, whereby said transverse passage serves the function of a vent to the connecting passage and provides a path way for the insertion of a pen filler to the ink level in the connecting passage.

7. In a dispensing device, a fountain provided with a plurality of chambers and with a wall separating said chambers, a passage connecting said chambers below the lower edge of said wall, a seat face positioned in one of said chambers above the normal level of the liquid adapted to be contained in said chambers and said connecting passage, a container coupled to the fountain for feeding liquid material to one of said chambers, said container being in contact with said seat face of the chamber, and a tubular member extending upwardly from one of said chambers and entering said container, said tubular member being provided with a slot in communication with the connecting passage and the upper edge of which slot is positioned for an appreciable distance below the bottom edge of said intervening wall.

8. In a dispensing device, a fountain embodying a plurality of chambers and a wall separating said chambers, one of said chambers being provided with a seat face occupying a plane above the normal level of the liquid material in the chambers, a passage connecting said chambers below the intervening wall, and a transverse passage in the intervening wall, said transverse passage extending upwardly from the connecting passage at a point intermediate the two said chambers and the upper end of said transverse passage opening through the top surface of the fountain.

9. In a dispensing device, a fountain provided with a dip chamber and with a reservoir chamber, said reservoir chamber being provided with an interior ledge affording a seat face which is in a horizontal plane above the normal level of the fluid adapted to be contained within said chambers, in combination with a container provided with a closure composed of compressible material an end portion of which protrudes beyond the container, said container and its closure being adapted to be inverted into said reservoir chamber for the protruding portion of the closure to occupy the seat face, and means for coupling said inverted container to said fountain.

10. In a dispensing device, a fountain embodying a reservoir chamber, a dip chamber, a channel connecting the two said chambers, and a ledge affording a seat face, said ledge being positioned in the reservoir chamber and occupying therein a horizontal plane above the normal level of the liquid material adapted to be contained within the said chambers and the connecting channel, combined with an inverted container partially filling the reservoir chamber, a closure for said container, said closure being composed of compressible material and protruding from the mouth of the container and contacting with the seat face of the fountain, and a screw connection intermediate the container and the fountain for coupling the container so as to compress the protruding portion of the closure against the seat face of the fountain.

11. In a dispensing device, a fountain provided with a reservoir chamber, a dip chamber, a channel connecting the two said chambers, and a ledge affording a seat face positioned within the reservoir chamber and occupying a horizontal plane above the normal level of the fluid adapted to be contained within said chambers and the connecting channel, combined with a stem projecting from the reservoir chamber above the horizontal ledge therein, and an inverted container the mouth of which is occupied by an apertured closure provided with a displaceable plug, said closure of the container being in contact with the seat face afforded by the horizontal ledge and the plug being displaceable from the container by the stem during the operation of positioning said container upon the fountain.

12. In a dispensing device, a fountain provided with a dip chamber, a reservoir chamber the wall of which is provided with a screw thread, a channel connecting said chambers, and a horizontal ledge affording a seat face within the reservoir chamber below the screw thread and positioned in a plane above the level of the liquid adapted to occupy the chambers and the channel, combined with an inverted container having a thread adapted to be screwed into the threaded part of the reservoir chamber, a closure of compressible material fitted in the mouth of the container and adapted to occupy the seat face so as to be compressed by contact therewith in the operation of connecting the container to the fountain, a plug removably fitted to the closure, and a stem fixed to the reservoir chamber and projecting therefrom so as to engage with the plug and displace it from the closure in the operation of coupling the container to the fountain.

13. In a dispensing device, a fountain provided with a dip chamber and an apertured top, a tubular reservoir fixed to the bottom of the dip chamber and extending upwardly therein to a line above the liquid level, the interior surface of said tubular reservoir being provided with vertical parallel ribs presenting a plurality of float-contacting faces of narrow cross section, said ribs being spaced equidistantly to produce a plurality of fluid ducts the aggregate cross sectional area of which exceeds the horizontal cross sectional area of the ribs so as to afford passages of wide area for the unimpeded flow of liquid therethrough, and a float positioned within said tubular reservoir for free movement therein, the area of contact between the float and the ribs being limited to the relatively narrow lines afforded by the exposed edges of said ribs.

In testimony whereof I have hereunto signed my name this 30th day of April 1918.

RONEY P. TOMPKINS.